US009509551B2

(12) United States Patent
Chou et al.

(10) Patent No.: US 9,509,551 B2
(45) Date of Patent: Nov. 29, 2016

(54) CORRELATION OF SYNCHRONOUS AND ASYNCHRONOUS HIERARCHICAL DATA IN LOOSELY-COUPLED DATA PROCESSING SYSTEMS

(71) Applicants: S. Kris Chou, Alpharetta, GA (US); Paul Hudgins, Roswell, GA (US); Aung Htay, Alpharetta, GA (US)

(72) Inventors: S. Kris Chou, Alpharetta, GA (US); Paul Hudgins, Roswell, GA (US); Aung Htay, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 620 days.

(21) Appl. No.: 13/727,111

(22) Filed: Dec. 26, 2012

(65) Prior Publication Data
US 2014/0177450 A1   Jun. 26, 2014

(51) Int. Cl.
H04J 3/06 (2006.01)
G06F 15/16 (2006.01)
H04L 12/24 (2006.01)

(52) U.S. Cl.
CPC ........... *H04L 41/044* (2013.01); *H04L 41/065* (2013.01); *H04L 41/069* (2013.01); *H04L 41/0686* (2013.01)

(58) Field of Classification Search
CPC combination set(s) only.
See application file for complete search history.

(56) References Cited

U.S. PATENT DOCUMENTS

| | | | |
|---|---|---|---|
| 7,783,750 B1* | 8/2010 | Casey | H04L 41/5009 709/224 |
| 7,937,690 B2* | 5/2011 | Casey | 717/128 |
| 2004/0123293 A1* | 6/2004 | Johnson | 718/101 |
| 2006/0064483 A1* | 3/2006 | Patel | 709/224 |
| 2006/0085798 A1* | 4/2006 | Bendiksen et al. | 719/318 |
| 2007/0060367 A1* | 3/2007 | Heler | G06Q 10/06 463/42 |
| 2007/0294224 A1* | 12/2007 | Heler | G06F 9/466 |

* cited by examiner

*Primary Examiner* — Aftab N. Khan
(74) *Attorney, Agent, or Firm* — Clements Bernard PLLC; Christopher L. Bernard; Lawrence A. Baratta, Jr.

(57) ABSTRACT

A method, a server, and a management system correlate performance data in loosely coupled software, such as network and element management systems, with minimal overhead. The systems and methods can be used to determine performance bottlenecks and interdependencies between components by correlating and analyzing collected data. In an exemplary embodiment, the systems and methods can relate to network management systems (NMSs), element management systems (EMSs), and the like, which are collectively referred to herein as management systems. Management systems can include a loosely coupled software architecture that utilizes a message-based communication mechanism. As messages are processed, synchronous calls between components of the management system as employed as well. For the purpose of performance analysis and optimization, the systems and method correlate data between synchronous and asynchronous interactions as each message is processed through a management system.

16 Claims, 7 Drawing Sheets

CORRELATION OF SYNCHRONOUS AND ASYNCHRONOUS HIERARCHICAL DATA IN LOOSELY-COUPLED DATA PROCESSING SYSTEMS

FIELD OF THE DISCLOSURE

The present disclosure relates generally to network management systems and methods. More particularly, the present disclosure relates to correlation of synchronous and asynchronous hierarchical data in loosely-coupled data processing systems for security analysis, performance analysis, optimization, and the like.

BACKGROUND OF THE DISCLOSURE

Conventionally, networks are deployed with various network elements or equivalents forming physical nodes that communicate to one another. There can be various different layers and types of networks all part of an operator's overall network. For example, different layers can include, without limitation, optical (e.g., campus, metro, regional, long-haul, submarine, etc.), access (e.g., digital subscriber loop, passive optical, wireless, cable, etc.), wireless (e.g., cellular, wireless local area network, etc.), data (e.g., Ethernet, Internet Protocol, etc.), and the like. From an operational perspective, the operator manages the network and/or the individual network elements via a network management system (NMS), an element management system (EMS), a craft interface (CI), an Operations Support System (OSS), and the like. For illustration purposes, the aforementioned systems can be generally referred to as network management systems. Network management may include a combination of systems in a distributed fashion. Further, a hierarchical fashion can be used with a so-called "manager of managers" integrating lower level systems. Even singularly deployed systems can be viewed as a distributed system based on virtualization whereby numerous processes are implemented separately on a single system in a virtualized manner.

As networks grow and become more complex, network management systems receive a lot of data such as network events, traps, alarms, etc. each of which can be generally referred to as a message that has to be processed. That is, the network management systems have a tremendous amount of data that has to continually be processed with many concurrencies ongoing simultaneously. At present, metric collections are performed separately for synchronous and asynchronous interactions. The synchronous collection is optionally stored in a database. The asynchronous metrics are limited to entry and exit timestamps and currently exported in a comma-separated text format. There is no way to correlate between the two data sets which is critical for performance analysis. In an asynchronous message-based software system such as the network management systems, each message is processed independently of other system components. However, messages processed by one system component are typically published again for a different component to process. This pattern can be repeated many times causing a nested hierarchy of message processing. With this loose coupling, it is difficult to determine performance bottlenecks and to determine the interdependencies between components of the network management systems. This is important as the complexity of the network management systems and the underlying networks has grown making real-world troubleshooting and performance optimization critical.

BRIEF SUMMARY OF THE DISCLOSURE

In an exemplary embodiment, a method includes intercepting asynchronous messages between components in a loosely-coupled data processing system and appending a lightweight message header thereto with correlation identification data and timestamp data associated therewith; intercepting synchronous method calls in the loosely-coupled data processing system and automatically tracking correlation identification data and timestamp data associated therewith; storing message header data associated with the asynchronous messages upon each of the asynchronous messages reaching its final destination in the loosely-coupled data processing system; and storing metrics for the synchronous hierarchical method calls. The method can further include dynamically enabling or disabling the intercepting and storing steps in the loosely-coupled data processing system. The method can further include, prior to the storing steps, sending the message header data associated with the asynchronous messages and the metrics for the synchronous hierarchical method calls to a data store using an out-of-band message channel. The method can further include analyzing the message header data associated with the asynchronous messages and the metrics for the synchronous hierarchical method calls for performance and optimization thereof.

The method can further include analyzing the message header data associated with the asynchronous messages and the metrics for the synchronous hierarchical method calls to ensure policy is maintained between components of the loosely-coupled data processing system. The method can further include analyzing the message header data associated with the asynchronous messages and the metrics for the synchronous hierarchical method calls to identify bottlenecks in the loosely-coupled data processing system. The method can further include, for each asynchronous message, utilizing the lightweight message header to provide updates for each component through which the asynchronous message is processed in the loosely-coupled data processing system. Optionally, the loosely-coupled data processing system includes a server operating a plurality of components through which the asynchronous messages are exchange and through which the synchronous hierarchical method calls are performed. The server can include a network management system communicatively coupled to a plurality of network elements. Alternatively, the loosely-coupled data processing system includes a plurality of servers each operating a plurality of components through which the asynchronous messages are exchange and through which the synchronous hierarchical method calls are performed. The plurality of servers can include a network management system communicatively coupled to a plurality of network elements.

In another exemplary embodiment, a server includes a network interface, a data store, a processor, and memory each of which is communicatively coupled therebetween; and instructions that, when executed, cause the processor to: intercept asynchronous messages between components operating on the server and append a lightweight message header thereto with correlation identification data and timestamp data associated therewith; intercept synchronous hierarchical method calls in server and automatically track correlation identification data and timestamp data associated therewith; store message header data associated with the asynchronous messages upon each of the asynchronous messages reaching its final destination in the server; and store metrics for the synchronous hierarchical method calls. The instructions, when executed, can further cause the processor to dynamically enable or disable the intercepting and storing steps in the loosely-coupled data processing system. The instructions, when executed, can further cause the processor to, prior to the store steps, send the message header data associated with the asynchronous messages and the metrics for the synchronous hierarchical method calls to the data store using an out-of-band message channel. The instructions, when executed, can further cause the processor to analyze the message header data associated with the asynchronous messages and the metrics for the synchronous hierarchical method calls for performance and optimization thereof.

The instructions, when executed, can further cause the processor to analyze the message header data associated with the asynchronous messages and the metrics for the synchronous hierarchical method calls to ensure policy is maintained between components of the server. The instructions, when executed, can further cause the processor to analyze the message header data associated with the asynchronous messages and the metrics for the synchronous hierarchical method calls to identify bottlenecks in the server. The instructions, when executed, can further cause the processor to for each asynchronous message, utilize the lightweight message header to provide updates for each component through which the asynchronous message is processed in the server. The server can include a network management system communicatively coupled to a plurality of network elements.

In yet another exemplary embodiment, a management system includes a plurality of servers communicatively coupled to a plurality of network elements; a plurality of components executed on the plurality of servers, wherein the plurality of components exchange a plurality of asynchronous messages therebetween and perform a plurality of synchronous calls therebetween; a messaging subsystem configured to intercept the plurality of asynchronous messages between the plurality of components operating on the plurality of servers and append a lightweight message header thereto with correlation identification data and timestamp data associated therewith; and the messaging subsystem is further configured to intercept synchronous hierarchical calls between the plurality of components and automatically track correlation identification data and timestamp data associated therewith.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods are presented for correlating performance data in loosely coupled software, such as network and element management systems, with minimal overhead. The systems and methods can be used to determine performance bottlenecks and interdependencies between components by correlating and analyzing collected data. In an exemplary embodiment, the systems and methods can relate to network management systems (NMSs), element management systems (EMSs), and the like, which are collectively referred to herein as management systems. Management systems can include a loosely coupled software architecture that utilizes a message-based communication mechanism. As messages are processed, synchronous calls between components of the management system are employed as well. For the purpose of performance analysis and optimization, the systems and method correlate data between synchronous and asynchronous interactions as each message is processed through a management system.

In an exemplary embodiment, the systems and methods utilize a lightweight header to carry a correlation identifier, entry and exit timestamps, and service information within message payloads for asynchronous interactions. Synchronous request-response interactions between components are tracked separately using a stack of hierarchical (parent-child) correlation identifiers. When these two data sources are correlated, this data can be analyzed for performance bottlenecks, abnormal software behavior and optimization. Advantageously, the correlation identifiers for the synchronous and asynchronous interactions allows for coupling of performance and optimization metrics in an inherently loose-coupled architecture with minimal intrusiveness. As such, complex software systems such as the management systems can be easily optimized and performance bottlenecks can be addressed.

Figure 1:
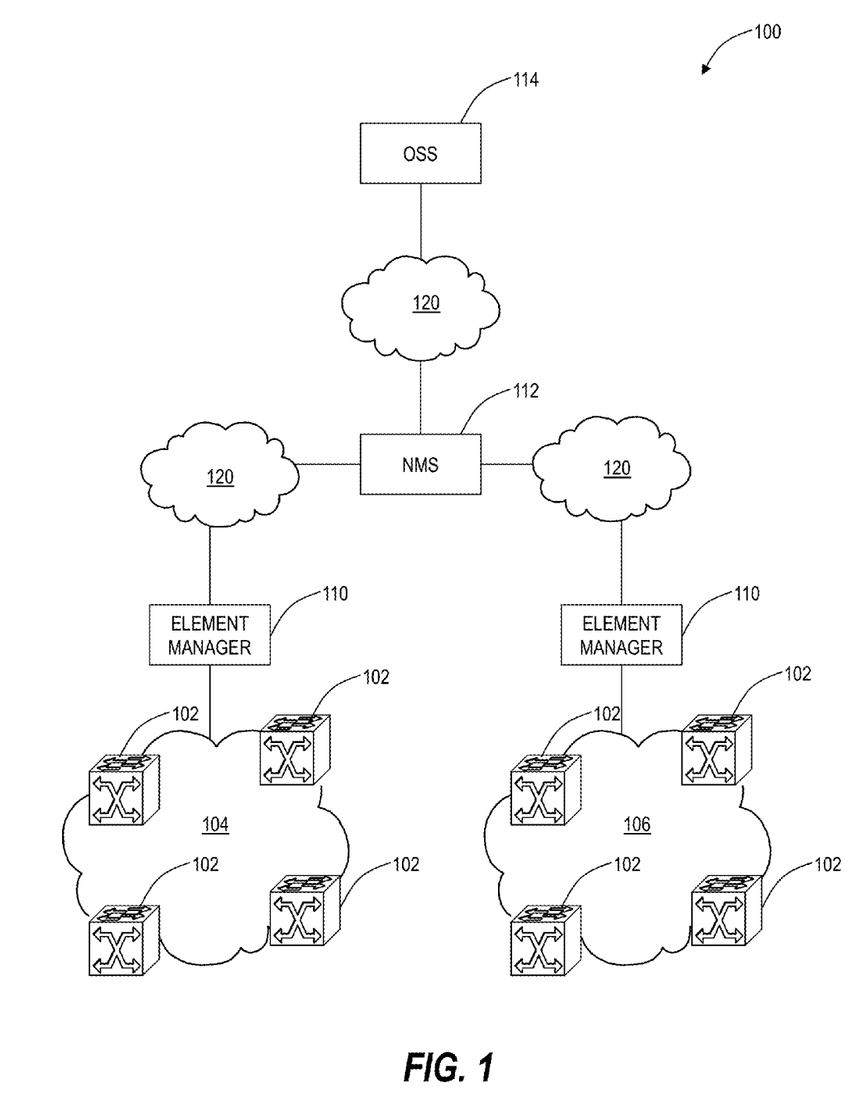
FIG. 1 is a network diagram of a network management system managing a plurality of network elements.

Referring to FIG. 1, in an exemplary embodiment, a network management system 100 is illustrated managing a plurality of network elements 102. The network elements 102 may include packet switches, computers, servers, routers, optical switches, access/aggregation switches, SONET/SDH multiplexers, OTN switches, wavelength division multiplexed (WDM) devices, and the like. In the example of FIG. 1, the network management system 100 is shown for illustration purposes managing two different networks 104, 106 formed from the plurality of network elements 102. The network elements 102 in each of the networks 104, 106 are interconnected by various links. Each link directly connects two of the network elements 102 together. The network management system 100 includes, for example, element managers 110, a network management system (NMS) 112, and an operations support system (OSS) 114. The network management system 100 is an exemplary hierarchical management system than may be implemented by a network operator, service provider, or the like. In an alternative embodiment, the network management system 100 could include a single NMS 112 by itself communicatively coupled to the plurality of network elements 102. Those of ordinary skill in the art will recognize the systems and methods described herein apply equally to a single management system as well as a distributed management system.

The element managers 110 are physically connected to one or more of the network elements 102 in the networks 104, 106. Note, the elements managers 110 do not require physical connectivity to all network elements 102, but may be connected logically, i.e. communicatively coupled, to all the network elements 102 by virtue of the physical connection to some of the network elements 102 who in turn have physical connections to other network elements 102 providing the element manager logical connectivity. The element manager 110 may communicate with the network elements 102 using one or more of a variety of techniques. For example, the communication may take place via Internet Protocol (IP) packets, Simple Network Management Protocol (SNMP) messages, Extensible Markup Language (XML) messages, command-line interface (CLI) commands, Java Remote Method Invocation (RMI), NETCONF messages, or the like.

Each of the element managers 110 may be communicatively coupled to the NMS 112. In general, the NMS 112 provides higher layer network management from the element manager 110, e.g. a "manager of managers". For example, the element managers 110 may provide management of the network elements 102 and the NMS 112 may provide integration of management of the network elements 102 with other types of network elements. For example, the NMS 112 may consolidate management of Ethernet switches, WDM optical network elements, optical switches, SONET/SDH network elements, data routers, and the like. The NMS 112 may be connected via a data communication network (DCN) 120 to the element managers 110. The interface between the NMS 112 and the element managers 110 may take place via Internet Protocol (IP) packets, SNMP messages, XML messages, CLI commands, RMI, NETCONF, and the like. Further, the interface may be TMF814 compliant (TMF814 available at www.tmforum.org), Common Object Request Broker Architecture (CORBA) compliant, and the like. Note, the NMS 112 may be omitted in the network management system 100 and the element managers may communicate directly to the OSS 114 in other exemplary embodiments.

The OSS 114 is typically a high level management system supporting processes such as maintaining network inventory, provisioning services, configuring network components, and managing faults across the network elements 102 as well as any other type of network element in a service provider's network. For example, the OSS 114 may integrate management of the service provider's entire network include optical, data, wireless, telephony switching, and the like. The OSS 114 may connect to the NMS 112 via the DCN 120 or alternatively directly to the element managers 110 via the DCN 120. The interface between the OSS 114 and the element managers 110 and/or the NMS 112 may take place via Internet Protocol (IP) packets, SNMP messages, XML messages, CLI commands, RMI, NETCONF, and the like. Further, the interface to the OSS 114 may include various integration standards such as TMF 513/608/814, Metro Ethernet Form (MEF) 7, ITU M.3100, Multi-Technology Operations System Interface (MTOSI), Common Object Request Broker Architecture (CORBA), and the like.

In various exemplary embodiments, the network management system 100 is configured to provide OAM&P functionality, FCAPS (Fault, Configuration, Accounting, Performance, and Security) functionality, and the like. The systems and methods described herein include various techniques, processes, systems, and methods for correlating asynchronous and synchronous interactions within the network management system 100. That is, the systems and methods enable correlation of messages as they pass through a single device or through multiple devices of the network management system 100. Specifically, the systems and methods include four exemplary functions, namely instrumentation, correlation identifier generation and propagation, metric collection and storage, and analysis. For instrumentation, annotation and interceptor technologies are used to make the instrumentation of the services and messaging unobtrusive. For correlation identifier generation and propagation, correlation identifiers are generated to tie the asynchronous and synchronous aspects as well as the hierarchical synchronous relationships of the services.

The Metrics collection and storage can be dynamically turned on/off. This subsystem is decoupled from the business services deployment for low performance overhead, and is used to troubleshoot and identify problems and bottlenecks along with the analysis portion. With the systems and methods, performance analysis and optimization insights for business service lifecycle are possible with the correlation of asynchronous and hierarchical synchronous metrics. Furthermore, software security analysis can be performed using expected behavior policies.

Figure 2:
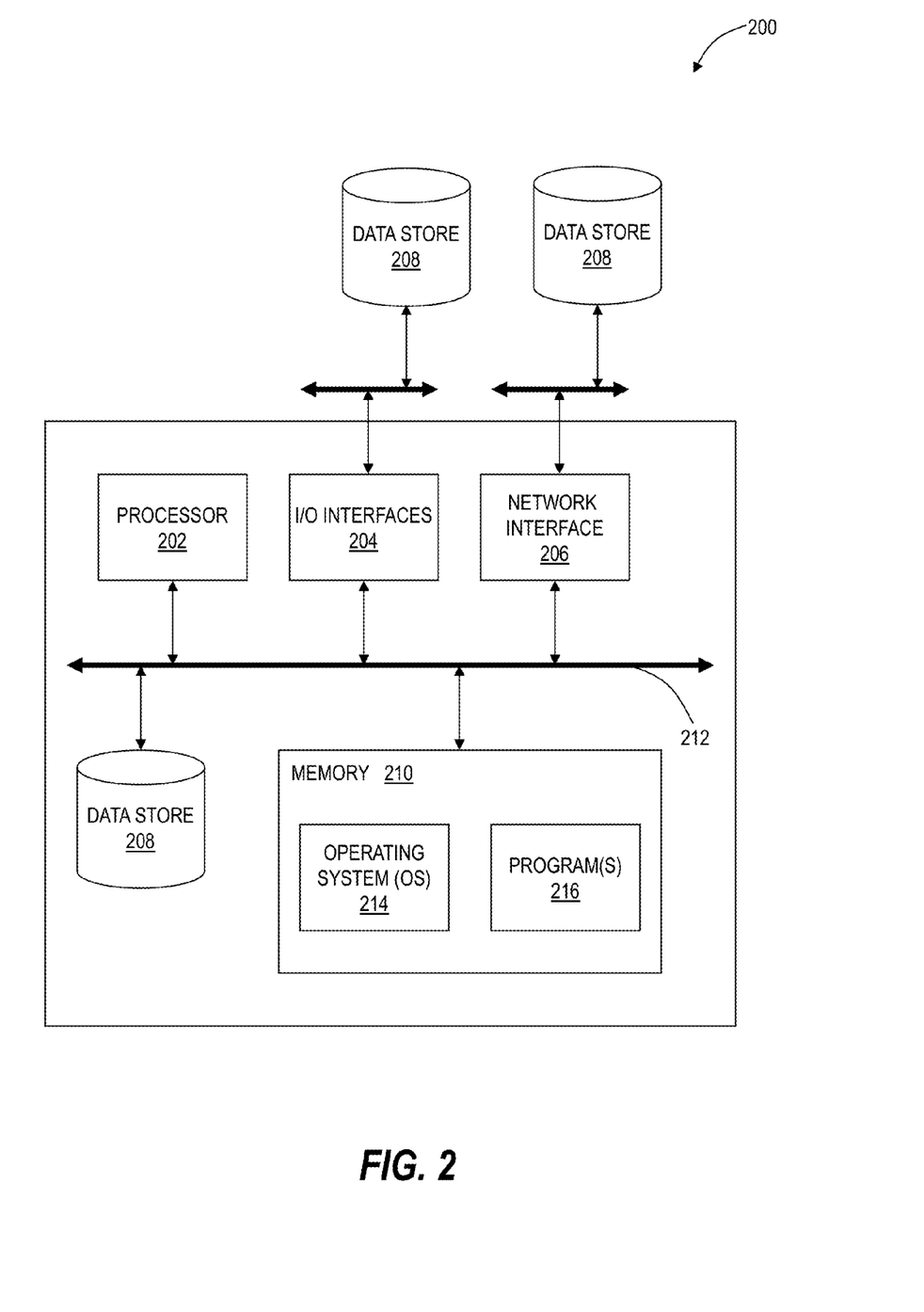
FIG. 2 is a block diagram of a server which may be utilized in an exemplary implementation of the various components of the network management system of FIG. 1.

Referring to FIG. 2, in an exemplary embodiment, a block diagram illustrates a server 200 which may be utilized in an exemplary implementation of the element manager 110, NMS 112, and/or the OSS 114. The element manager 110, NMS 112, or the OSS 114 may be formed through one or more servers 200. For example, the element manager 110 may include a single implementation of the server 200 whereas the NMS 112 or the OSS 114 may include a plurality of the servers 200 in a server farm, data center, etc. type configuration. The server 200 may be a digital computer that, in terms of hardware architecture, generally includes a processor 202, input/output (I/O) interfaces 204, a network interface 206, a data store 208, and a memory 210. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 can include, for example, a serial port, a parallel port, a small computer system interface (SCSI), an infrared (IR) interface, a radio frequency (RF) interface, and/or a universal serial bus (USB) interface.

The network interface 206 may be used to enable the server 200 to communicate on a network, such as the Internet, the DCN 120, etc. For example, the server 200 can utilize the network interface 206 to communicate to/from the network elements 102, to/from the element managers 110, to/from the NMS 112, to/from the OSS 114, etc. The network interface 206 may include, for example, an Ethernet card or adapter (e.g., 10 BaseT, Fast Ethernet, Gigabit Ethernet) or a wireless local area network (WLAN) card or adapter (e.g., 802.11a/b/g/n). The network interface 206 may include address, control, and/or data connections to enable appropriate communications on the network. A data store 208 may be used to store data, such as a management information base (MIB). The MIB is virtual database used for managing the entities, i.e. the network elements 102, in a communications network. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 206. The operating system 214 essentially controls the execution of other computer programs, such as the one or more programs 206, and provides scheduling, input-output control, file and data management, memory management, and communication control and related services. The one or more programs 216 may be configured to implement the various processes, algorithms, methods, techniques, etc. described herein with respect to the network management system 100.

Figure 3:
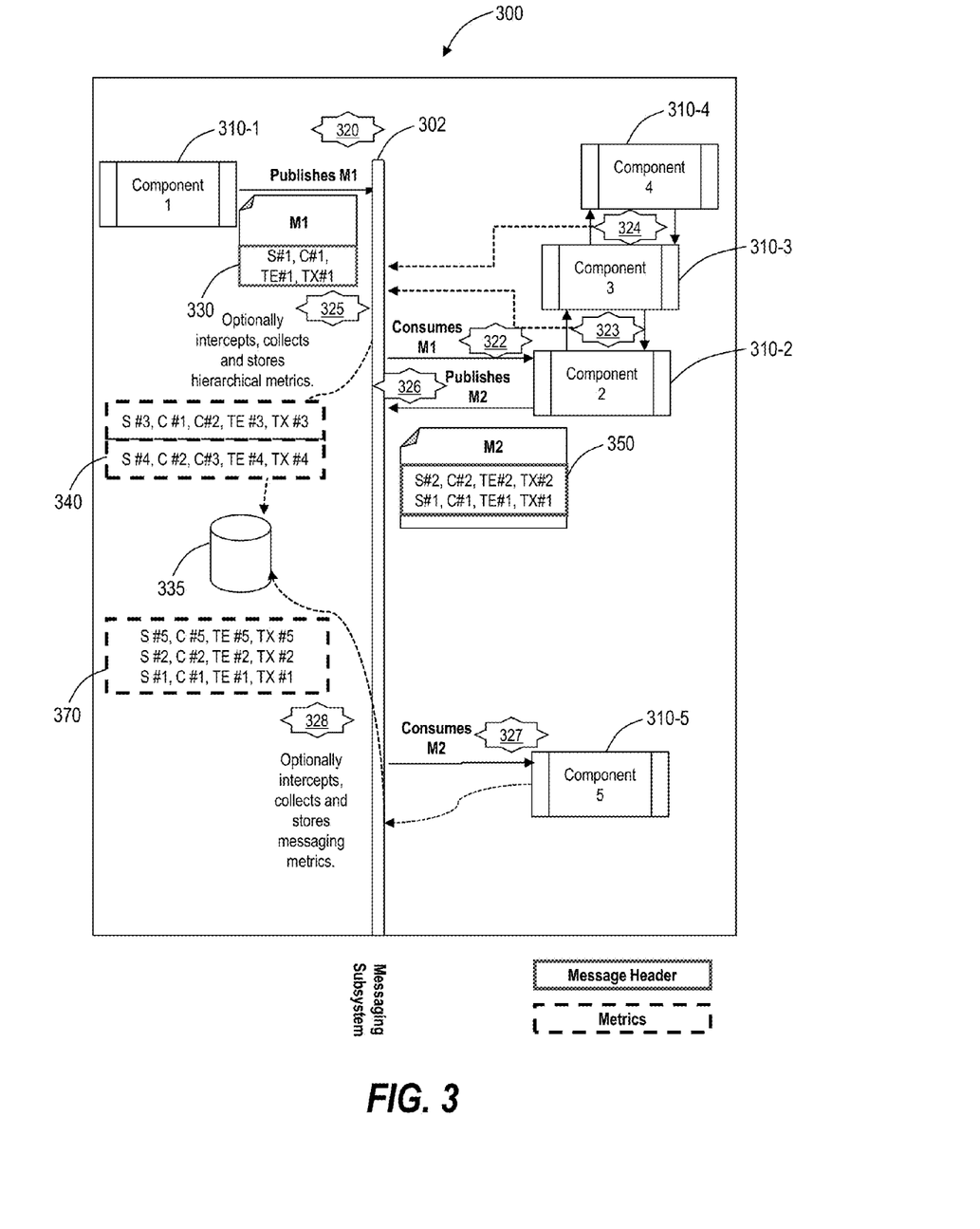
FIG. 3 is block diagram of a messaging system, a messaging subsystem, and the associated flow of messages therein.

Referring to FIG. 3, in an exemplary embodiment, a block diagram illustrates a messaging system 300, a messaging subsystem 302, and the associated flow of messages therein. The messaging system 300 can be implemented by the management system 100, the server 200, or the like. Specifically, the messaging system 300 is implemented in a computer system such as the management system 100 to track and gather statistics associated with internal message processing therein. The messaging system 300 of FIG. 3 is presented with example messages, M1, M2, to illustrate operation of the systems and methods. The messaging system 300 includes five components 310 (labeled as 310-1, 310-2, 310-3, 310-3, 310-4, 310-5) which process the example messages M1, M2. The components 310 are software processes performing some function on the messages M1, M2. For example, the components 310 can be part of the management system 100 performing OAM&P processing on the messages M1, M2 which could be notifications from one of the network elements 102.

The messaging system 300 and the messaging subsystem 302 are illustrated with reference to eight exemplary steps 321-328. First, in step 320, the first component 310-1 publishes a first message, M1. The messaging subsystem 302 intercepts the first message, M1, and automatically adds service identification (S #1), a correlation identifier (C #1), an entry timestamp (TE #1) and an exit timestamp (TX #1) into a message header 330 on the first message, M1. At this point, the message header 330 includes:

S#1, C #1, TE #1, TX #1

Next, in step 322, the message M1 is sent (consumed) by the component 310-2. The messaging subsystem 302 intercepts the message M1 as it is consumed by the component 310-2 and adds an entry timestamp (TE #2) to the message header 330. At this point, the message header 330 includes:

TE #2
S#1, C #1, TE #1, TX #1

In step 323, the component 310-2 makes a synchronous request to the component 310-3. In step 324, as part of the handling of the synchronous request, the component 310-3 makes a synchronous request to component 310-4. When component 310-4 responds to the component 310-3, the component 310-3 in turn responds to the component 310-2. In step 325, the messaging subsystem 302 intercepts the foregoing synchronous requests or method calls and automatically tracks the hierarchical parent-child correlation identifiers, entry timestamps, and exit timestamps associated therewith and optional saves this information in persistence 335. For example, this information can include metrics 340 as follows:

| Service, Parent, Self, Entry, Exit | Service, Parent, Self, Entry, Exit |
|---|---|
| S #3, C #1, C #2, TE #3, TX #3 | S #4, C #2, C #3, TE #4, TX #4 |

In step 326, the component 310-2 publishes a second message, M2. The messaging subsystem 302 intercepts the second message, M2, an automatically adds a message header 350 which includes service identification (S #2), a correlation identifier (C #2) and an exit timestamp (TX #2). The second message, M2, can be related to the first message, M1, and the entry timestamp (TE #2) was added in the step 322. For example, the message header 350 can include:

S #2, C #2, TE #2, TX #2
S #1, C #1, TE #1, TX #1

In step 327, the messaging subsystem 302 intercepts the second message, M2, and adds an entry timestamp (TE #5) to the message header 350 as the second message, M2, is consumed by its last destination, the component 310-5. For example, the message header 350 can now include:

| TE #5 |
| --- |
| S #2, C #2, TE #2, TX #2 |
| S #1, C #1, TE #1, TX #1 |

In step 328, the messaging subsystem 302 intercepts the second message, M2, at a final destination point and adds a service identification (S #5), a correlation identifier (C #5), an exit timestamp (TX #5) and optionally saves the message header 350 as metrics 370 in persistence 335.

The messaging system 300 and the messaging subsystem 302 minimize the performance overhead of metrics collection by allowing the user to dynamically turn on/off the collection. When it is enabled, it uses an out of band message channel to send the metrics 340, 370 data for persistence. Upon completion of the steps 321-328, records of the synchronous and asynchronous activities triggered by messages M1, M2 are persisted. These entries can then be analyzed to give insight into performance and optimization metrics. Expected software behavior policies can also be established. For example, a policy explicitly stating that component 310-5 is not allowed to cause invocation on component 310-1 either synchronously or asynchronously can be established. This policy validation and possible violations can be detected during analysis of the records.

Figure 4:
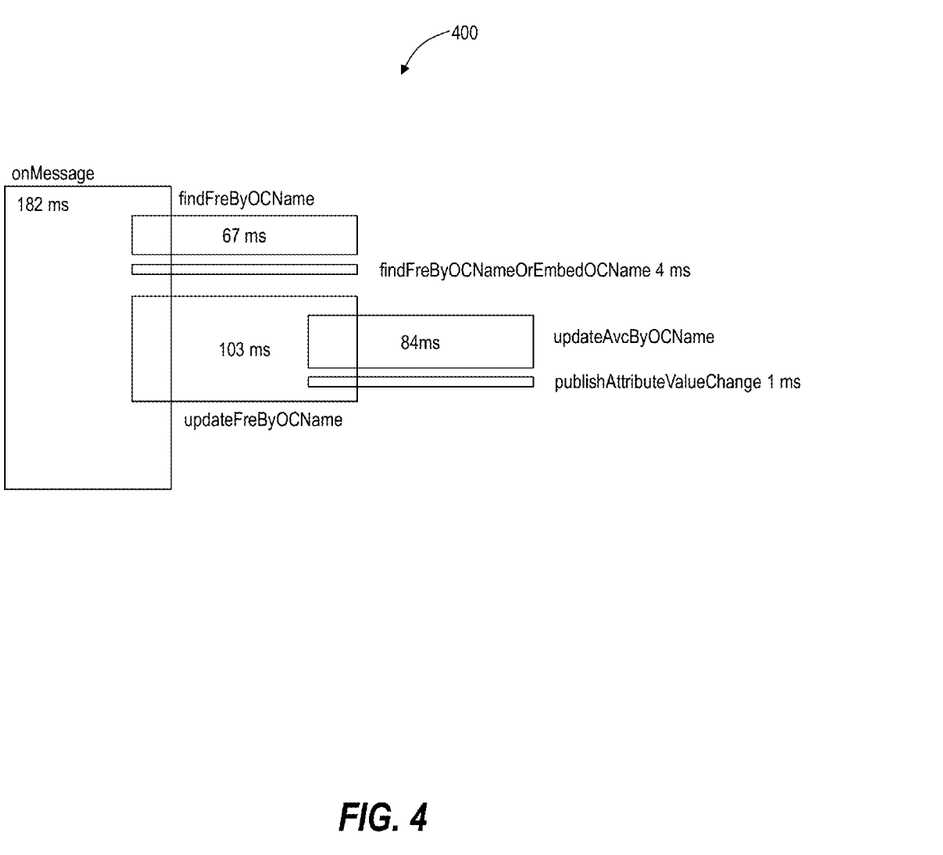
FIG. 4 is a pictorial representation of the relative composition of execution times from the hierarchical synchronous methods of FIG. 3.

Referring to FIG. 4, in an exemplary embodiment, a pictorial representation 400 illustrates the messages M1, M2 from the messaging system 300 and the messaging subsystem 302. The uniqueness of the messaging system 300 and the messaging subsystem 302 is the ability to track the path of messages and correlating the resultant synchronous and asynchronous interactions as the messages are processed, which is very difficult in a loosely coupled system. With the gathered data from the messaging system 300 and the messaging subsystem 302, performance and policy analysis is easily achieved. For example, the following performance and optimization metrics from the above case in FIG. 3 can be obtained:

The overall time for Message M1 (and its subsequent triggered messages) to be consumed (TX #5-TE #1).

Message M1 spends (TE #2-TX #1) time in the messaging subsystem 302 before being delivered to the component 310-2.

TX #2-TE #2 gives the time spent in the component 310-2 before the message M2 is published.

By using the correlation identifier C #1 as the parent, there are two hierarchical synchronous method invocations. The service S #3 takes TX #3-TE #3 time to complete and composed of service S #4, which takes TX #4-TE #4 to complete.

The messaging system 300 and the messaging subsystem 302 tracks multiple levels of hierarchical invocations. In the example below, the service 'onMessage' took 182 milliseconds to complete and as shown in the pictorial representation 400, it made three (3) synchronous calls 'findFreByOC-Name', 'findFreByOCNameOrEmbedOCName' and 'updateFreByOCName'. Furthermore, the service 'updateFreByOCName' made two (2) synchronous calls 'updateAvcByOCName' and 'publishAttributeValueChange'. Analysis shows that out of the 182 milliseconds, most of the time (103 milliseconds) was spent in 'updateFreByOCName'. Analysis can also reveal that 'onMessage' is directly calling 'findByOCNameOrEmbedOCName' when there is a policy against it.

As described herein, the systems and methods include four exemplary functions, namely instrumentation, correlation identifier generation and propagation, metric collection and storage, and analysis. The instrumentation seeks to make instrumentation of the services and messaging unobtrusive. The following examples shown the unobtrusiveness of this approach, i.e. only one line of code is needed for instrumentation. The following is an instrumentation example for Enterprise Java Bean:

```
@Stateless(name = RoutePlanner.NAME, mappedName =
RoutePlanner.MAPPED_NAME)
@Remote({ RoutePlanner.class })
@Interceptors({ SMMCInterceptor.class })
public class RoutePlannerBean implements RoutePlanner {
```

In the above example, the instrumentation code is @Interceptors({SMMCInterceptor.class}).

The following is an instrumentation example for a message recipient:

```
public class RouteChangeNotificationHandler extends
AbstractNotificationHandler<FreRouteChange> {
    @CollectTiming
    @Override
    public void processRouteChangePayload(final FreRouteChange
freRouteChange) {
        ...
        ...
    }
}
```

In the above example, the instrumentation code is @CollectTiming.

With respect to correlation identifier generation and propagation, correlation identifiers are universally unique identifiers (UUID). The systems and methods make use of two correlation identifiers: parent and self to track the hierarchical relationship. A unique correlation identifier is generated at the start of each asynchronous message journey and carried in the payload header until the end of the message journey. If the message is created as part of the business service method, the service's correlation identifier is also carried in the message payload header. When the service method is invoked as a result of processing the asynchronous message, the message's correlation identifier is treated as the parent correlation identifier of the service method. Between service method invocations, the correlation identifiers are carried as transaction attributes.

With respect to metric collection and storage, the metric collection and storage can be dynamically turned on/off. In an exemplary embodiment, implementation is provided by Java Management Extensions (JMX) technology. The collection of asynchronous and hierarchical synchronous metrics can be independently controlled. To minimize the overhead of metrics storage, an out of band asynchronous channel is used which is decoupled from the business services. The messaging frequency and payload volume can also be controlled to further minimize the impact of metric collection and storage.

Figure 5:
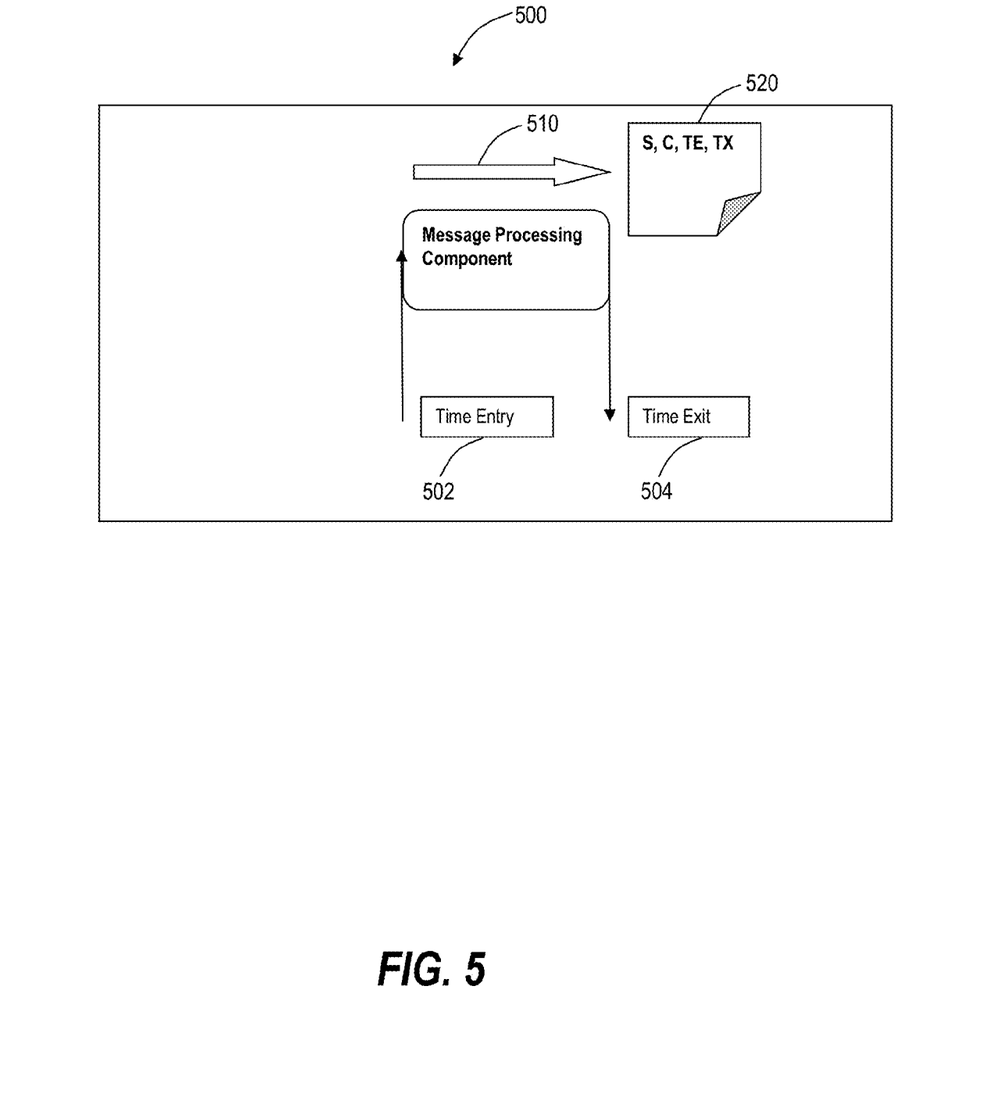
FIG. 5 is a block diagram of a time entry and time exit process for asynchronous messaging.

Referring to FIG. 5, in an exemplary embodiment, a block diagram illustrates a time entry and time exit process 500 for asynchronous messaging. The collections of 'time entry (TE)' and 'time exit (TX)' metrics 502, 504 are done using interceptor technology. As an asynchronous message 510 is passed from one component to another for processing, the TEs and TXs are collected and carried within a message header 520. In addition to timestamps, the correlation identifiers (C) and service identities (S) are also carried in the message header 520.

Figure 6:
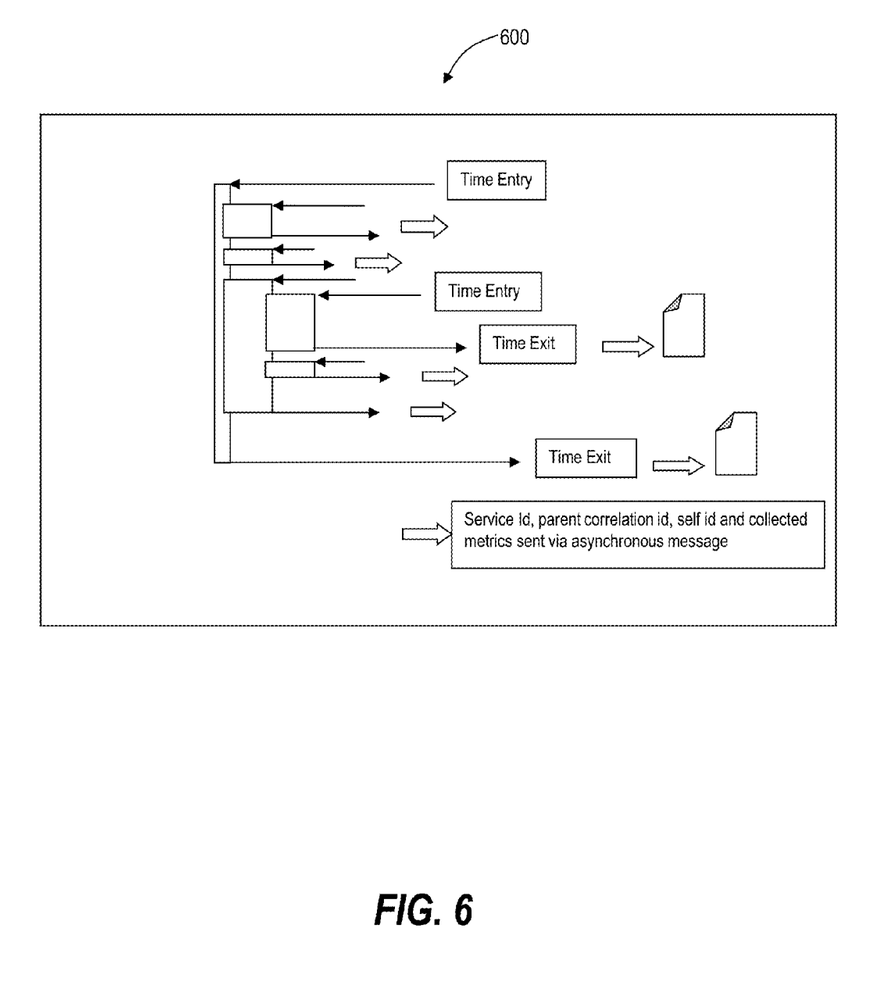
FIG. 6 is a block diagram of a time entry and time exit process for synchronous hierarchical methods.

Referring to FIG. 6, in an exemplary embodiment, a block diagram illustrates a time entry and time exit process 600 for synchronous hierarchical methods. For synchronous method invocations, time entry and time exit metrics are collected at each method's start and end. At the end of each method invocation, a service identifier, a parent correlation identifier, a self identifier, and time entry and time exit information is sent for persistence if the metrics collection is enabled.

Figure 7:
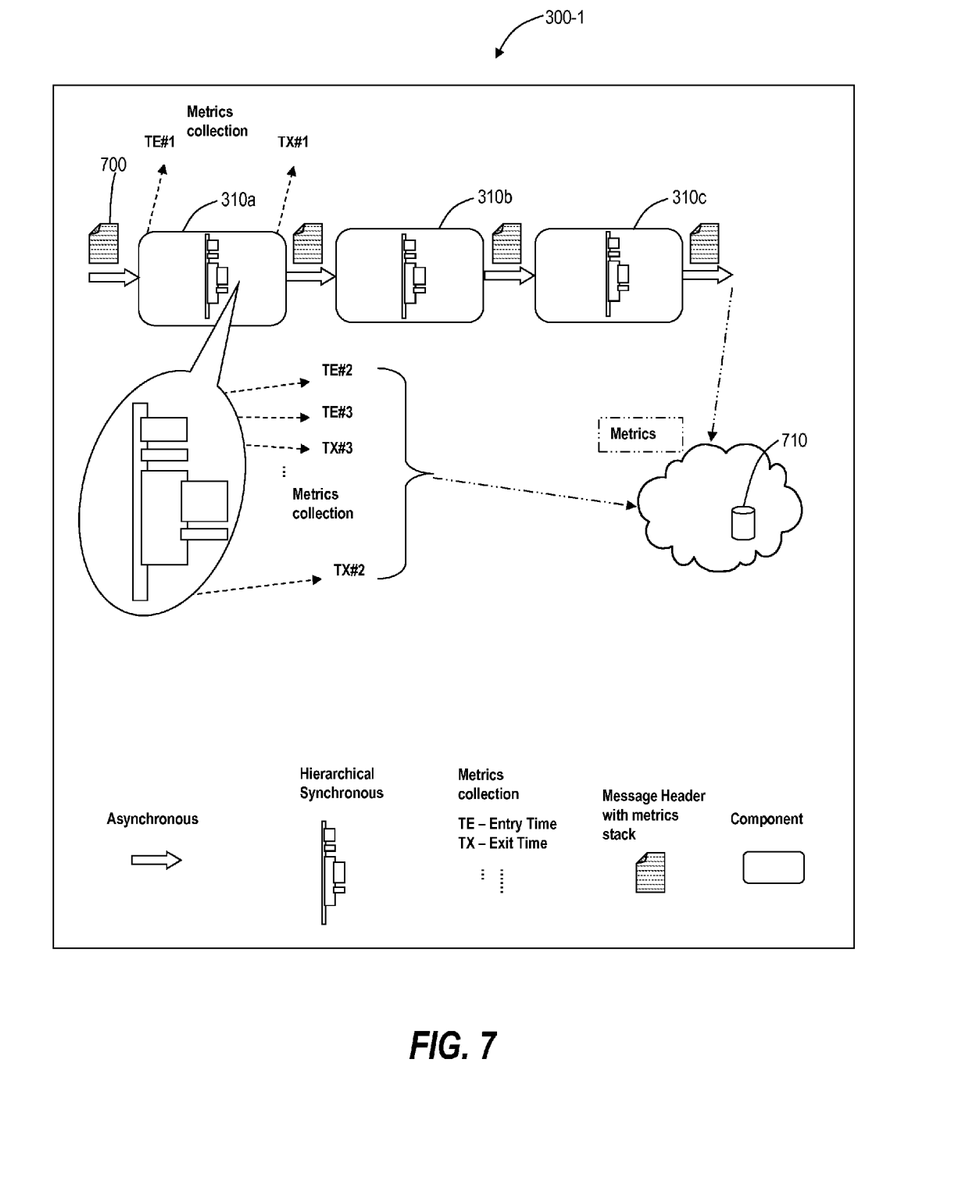
FIG. 7 is a block diagram of a messaging system showing system interactions initiated by the receipt of a message and the flow of the message across three components.

Referring to FIG. 7, in an exemplary embodiment, a block diagram illustrates a messaging system 300-1 showing system interactions initiated by the receipt of a message 700 and the flow of the message 700 across three components 310a, 310b, 310c. As is shown in the messaging system 300-1, metrics are collected through each of the components 310a, 310b, 310c and optionally the metrics are stored in a data store 710 for analysis thereof.

In addition to the performance and optimization insights provided by the systems and methods described herein, one novel use is in the area of software security. For example, a user might set up a rule "service S #1 should not directly or indirectly interact with service S #3". The systems and methods allow for detection of such rule violations which would otherwise be difficult in loosely coupled systems. Advantageously, the novelty of the systems and methods described herein is the use of light weight message header to carry the correlation identifier, service and timing information. The correlation identifier allows for coupling of performance and optimization metrics in an inherently loose-coupled architecture with minimal intrusiveness.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
   intercepting asynchronous messages between components in a loosely-coupled data processing system and appending a lightweight message header thereto, wherein the lightweight message header comprises correlation identification data with a parent, timestamp data, and service information for asynchronous interactions;
   for each asynchronous message, utilizing the lightweight message header to provide updates for each component through which the asynchronous message is processed in the loosely-coupled data processing system;
   intercepting hierarchical synchronous method calls in the loosely-coupled data processing system and automatically tracking the correlation identification data and the timestamp data associated therewith;
   storing message header data associated with the asynchronous messages subsequent to each of the asynchronous messages reaching its final destination in the loosely-coupled data processing system;
   storing metrics for the hierarchical synchronous method calls based on the correlation identification data and the timestamp data for the asynchronous messages, wherein the hierarchical synchronous method calls are tracked separately from the asynchronous messages;
   identifying performance bottlenecks based on the correlation identification data for the hierarchical synchronous method calls and the timestamp data for the asynchronous messages to optimize the loosely-coupled data processing system in a minimally intrusive manner; and
   analyzing the message header data associated with the asynchronous messages and the metrics for the synchronous hierarchical method calls to ensure policy is maintained between components of the loosely-coupled data processing system.

2. The method of claim 1, further comprising:
   dynamically enabling or disabling at least one of the intercepting and storing steps in the loosely-coupled data processing system.

3. The method of claim 1, further comprising:
   prior to the storing steps, sending the message header data associated with the asynchronous messages and the metrics for the synchronous hierarchical method calls to a data store using an out-of-band message channel.

4. The method of claim 1, wherein the loosely-coupled data processing system comprises a plurality of servers each operating a plurality of components through which the asynchronous messages are exchanged and through which the synchronous hierarchical method calls are performed.

5. The method of claim 1, further comprising:
   analyzing the message header data associated with the asynchronous messages and the metrics for the synchronous hierarchical method calls for performance and optimization thereof.

6. The method of claim 5, further comprising:
   analyzing the message header data associated with the asynchronous messages and the metrics for the synchronous hierarchical method calls to identify bottlenecks in the loosely-coupled data processing system.

7. The method of claim 1, wherein the loosely-coupled data processing system comprises a server operating a plurality of components through which the asynchronous messages are exchanged and through which the synchronous hierarchical method calls are performed.

8. The method of claim 7, wherein the server comprises a network management system communicatively coupled to a plurality of network elements.

9. The method of claim 7, wherein the plurality of servers comprise a network management system communicatively coupled to a plurality of network elements.

10. A server, comprising:
a network interface and a data store that are communicatively coupled; and
memory storing instructions that, when executed, cause a processor to:
  intercept asynchronous messages between components operating on the server and append a lightweight message header thereto, wherein the lightweight message header comprises correlation identification data with a parent, timestamp data, and service information for asynchronous interactions;
  for each asynchronous message, utilize the lightweight message header to provide updates for each component through which the asynchronous message is processed in the server;
  intercept synchronous hierarchical method calls in a server and automatically track the correlation identification data and the timestamp data associated therewith;
  store message header data associated with the asynchronous messages upon each of the asynchronous messages reaching its final destination in the server;
  store metrics for the synchronous hierarchical method calls based on the correlation identification data and the timestamp data for the asynchronous messages, wherein the synchronous hierarchical method calls are tracked separately from the asynchronous messages;
  identify performance bottlenecks based on the correlation identification data for the synchronous hierarchical method calls and the timestamp data for the asynchronous messages; and
  analyze the message header data associated with the asynchronous messages and the metrics for the synchronous hierarchical method calls to ensure policy is maintained between components of the server.

11. The server of claim 10, wherein the instructions, when executed, further cause the processor to:
dynamically enable or disable at least one of the intercepting and storing steps.

12. The server of claim 10, wherein the instructions, when executed, further cause the processor to:
prior to the storing steps, send the message header data associated with the asynchronous messages and the metrics for the synchronous hierarchical method calls to the data store using an out-of-band message channel.

13. The server of claim 10, wherein the server comprises a network management system communicatively coupled to a plurality of network elements.

14. The server of claim 10, wherein the instructions, when executed, further cause the processor to:
analyze the message header data associated with the asynchronous messages and the metrics for the synchronous hierarchical method calls for performance and optimization thereof.

15. The server of claim 14, wherein the instructions, when executed, further cause the processor to:
analyze the message header data associated with the asynchronous messages and the metrics for the synchronous hierarchical method calls to identify bottlenecks in the server.

16. A management system, comprising:
a plurality of servers communicatively coupled to a plurality of network elements; and
memory storing and a processor executing a plurality of components on the plurality of servers, wherein the plurality of components exchange a plurality of asynchronous messages there between and perform a plurality of synchronous calls there between;
wherein the plurality of components comprise a messaging subsystem configured to intercept the plurality of asynchronous messages between the plurality of components operating on the plurality of servers and append a lightweight message header thereto, wherein the lightweight message header comprises correlation identification data with a parent, timestamp data, and service information for asynchronous interactions, wherein, for each asynchronous message, the lightweight message header is utilized to provide updates for each component through which the asynchronous message is processed in the management system;
wherein the messaging subsystem is further configured to intercept synchronous hierarchical calls between the plurality of components and automatically track correlation identification data and timestamp data associated therewith based on the correlation identification data and the timestamp data for the asynchronous messages, wherein the synchronous hierarchical calls are tracked separately from the asynchronous messages;
wherein the messaging subsystem is further configured to identify performance bottlenecks based on the correlation identification data for the synchronous hierarchical calls and the timestamp data for the asynchronous messages, and
wherein the message header data associated with the asynchronous messages and the metrics for the synchronous hierarchical method calls are analyzed to ensure policy is maintained between components of the management system.

\* \* \* \* \*